United States Patent
Vazquez

(10) Patent No.: US 11,938,892 B2
(45) Date of Patent: Mar. 26, 2024

(54) SEATBELT BUCKLE FOR RESISTING CONTAMINANT

(71) Applicant: AUTOLIV ASP, INC., Ogden, UT (US)

(72) Inventor: Moises Mendoza Vazquez, Lerma (MX)

(73) Assignee: AUTOLIV ASP, INC., Ogden, UT (US)

( * ) Notice: Subject to any disclaimer, the term of this patent is extended or adjusted under 35 U.S.C. 154(b) by 77 days.

(21) Appl. No.: 17/676,557

(22) Filed: Feb. 21, 2022

(65) Prior Publication Data

US 2023/0264649 A1 Aug. 24, 2023

(51) Int. Cl.
B60R 22/18 (2006.01)

(52) U.S. Cl.
CPC ...... B60R 22/18 (2013.01); *B60R 2022/1806* (2013.01)

(58) Field of Classification Search
CPC .......... B60R 22/18; B60R 2022/1806
See application file for complete search history.

(56) References Cited

U.S. PATENT DOCUMENTS

| | | | |
|---|---|---|---|
| 4,065,836 A * | 1/1978 | Stephenson | A44B 11/2523 24/642 |
| 6,055,708 A * | 5/2000 | Ellis | A44B 11/2523 24/642 |
| 6,571,435 B2 | 6/2003 | Jain et al. | |
| 7,093,331 B1 | 8/2006 | Holmberg et al. | |
| 7,647,678 B2 | 1/2010 | Smith | |
| 9,038,250 B2 | 5/2015 | Betz et al. | |
| 10,080,400 B2 | 9/2018 | Corrion | |
| 10,201,213 B1 | 2/2019 | Chen | |
| 10,575,597 B2 | 3/2020 | Boughner et al. | |
| 10,863,799 B2 | 12/2020 | Chen | |
| 2002/0166216 A1 | 11/2002 | Jain et al. | |
| 2009/0083955 A1 | 4/2009 | Smith | |
| 2012/0240367 A1* | 9/2012 | Betz | A44B 11/2523 24/633 |
| 2015/0307062 A1 | 10/2015 | Corrion | |
| 2017/0215526 A1* | 8/2017 | Merrick | A44B 11/2523 |
| 2018/0078001 A1* | 3/2018 | Babin | A44B 11/2511 |

(Continued)

FOREIGN PATENT DOCUMENTS

| | | |
|---|---|---|
| DE | 102008046651 A1 | 3/2010 |
| EP | 1075803 A2 | 2/2001 |

(Continued)

*Primary Examiner* — David M Upchurch
(74) *Attorney, Agent, or Firm* — DICKINSON WRIGHT PLLC

(57) ABSTRACT

A seatbelt buckle for receiving a tongue of a latch plate in an occupant restraining system of a vehicle includes a housing having a frame and a locking mechanism operatively connected with the frame, an ejector operatively coupled to the locking mechanism, a button in sliding engagement with the locking mechanism, an opening formed in the housing for inserting the tongue of the latch plate into a passage formed in the housing, and a gate securely attached to the ejector and sized to fit in the opening of the housing. The ejector releasably retains the tongue of the latch plate and the button releases the locking mechanism. Further, the gate moves in a linear fashion along with the tongue of the latch plate.

17 Claims, 6 Drawing Sheets

(56) References Cited

U.S. PATENT DOCUMENTS

2019/0021450 A1    1/2019  Chen
2019/0133260 A1*   5/2019  Boughner .......... A44B 11/2523
2020/0315301 A1   10/2020  Chen

FOREIGN PATENT DOCUMENTS

EP        2545797 A1    1/2013
FR        3011789 B1    7/2016
WO     2002089627 A2   11/2002
WO     2012089402 A1    7/2012
WO     2014128318 A1    8/2014

* cited by examiner

SEATBELT BUCKLE FOR RESISTING CONTAMINANT

TECHNICAL FIELD

This present disclosure relates generally to a seatbelt buckle adapted for use as part of a motor vehicle occupant restraint system, and more particularly to a contaminant resistant seatbelt buckle device.

BACKGROUND

The statements in this section merely provide background information related to the present disclosure and may not constitute prior art.

Various seatbelt assemblies have certain common elements including seatbelt webbing that extends across the upper and lower torso of the occupant, and a retractor system for allowing protraction and retraction of the webbing so that the seatbelt may adapt to different sizes of occupants and be conveniently out of the way when not being used. Conventional active three point seatbelt assemblies further include a buckle which releasably retains a latch plate when used. The seatbelt assemblies is securely attached to vehicle structural elements in order to provide the necessary restraint effect in vehicle impact conditions and further to meet government regulations.

Typical seatbelt assemblies include a buckle that is securely mounted to a vehicle structure, such as a seat frame or the floor of the vehicle. The buckle includes a slot that is sized to receive and retain a latch plate, which is attached by passing the seatbelt webbing through an elongate opening or slot. The seatbelt webbing may be attached to the latch plate in a fixed manner, typical of dual retractor, active seatbelt systems, or the latch plate slide along the webbing typical for single retractor systems. Accordingly, the latch plate remains attached to the webbing, whether the seatbelt is in the buckled or unbuckled configuration. Further, the seatbelt webbing is fixed to the vehicle structure at one end by a retractor system having an internal spool that is configured to protract and retract the webbing in response to various external loads, and the opposite end is typically fixed to a vehicle structure by a fixed anchorage or by a second retractor.

The buckle is generally in the form of the housing that includes a push button release. A single slot is provided between the push button and the housing, into which a single latch plate is inserted. Because the seatbelt is inherently inserted and removed multiple times through the course of its life, there are prolonged instances where the seatbelt is in an unbuckled condition. In this condition, the buckle slot is open and capable of receiving the latch plate when buckling is desired by the occupant. The slot formed in the housing is susceptible to debris being inserted into the slot or inadvertently falling into the slot. Such debris can include coins, pins, paperclips, gravel, hairpins, rubber bands, spilled liquids and other similar items. Debris becoming lodged within the buckle may potentially interfere with proper buckle operation. Further, gaps or spaces formed between the buckle cover and the push button are also susceptible to the debris such as spilled liquids, etc.

Therefore, there is a need for a seatbelt buckle that is protected from potential damage caused by liquids, debris, and other contaminant that may occur during the normal operation of the vehicle.

SUMMARY

The present disclosure relates to a seatbelt buckle for restricting external objects from entering the housing of the buckle. The seatbelt buckle is generally attached to a structure of the vehicle in an upright position for ease of use and detection which adversely places the opening in a position to accumulate contaminants. Debris and liquid may enter the opening and the gap around the release button area. For restricting external objects from entering the inside of the buckle housing, the seatbelt buckle of the present disclosure has a gate sized to fit in the opening and a sealing member formed around the release button, which are easily added to the seatbelt buckle, currently used in production such that the manufacturing costs and time for the seatbelt buckle having the containment resistant feature can be reduced.

In accordance with an exemplary embodiment of the present disclosure, a seatbelt buckle for receiving a tongue of a latch plate in an occupant restraining system of a vehicle includes a housing including a frame and a locking mechanism operatively connected with the frame, an ejector operatively coupled to the locking mechanism, an opening formed in the housing for inserting the tongue of the latch plate into a passage formed in the housing, and a gate securely attached to the ejector and sized to fit in the opening of the housing. The ejector releasably retains the tongue of the latch plate and the gate attached to the ejector moves in a linear fashion along with the tongue of the latch plate.

In accordance with a further aspect of the present disclosure, the gate arranged between the ejector and the opening inside the passage of the housing extends to the opening of the housing when the tongue of the latch plate is not inserted and is collapsed toward the ejector when the tongue of the latch plate is inserted into the opening of the housing. When the gate extends to engage with an inner edge surface around the opening of the housing, the gate fits in the opening and restricts external objects from entering the opening of the housing. Further, when the gate is collapsed toward the ejector, the tongue of the latch plate is latched inside the housing of the seatbelt buckle.

In accordance with a further aspect of the present disclosure, the gate is formed with a first member, a second member, and at least one connecting member attached to each of the first and second members. The second member is formed with a pair of ears and the ejector is formed with a pair of recesses such that the pair of ears fit in the pair of recesses such that the second member is securely attached to the ejector. An outer perimeter of the first member engages with an inside edge surface around the opening of the housing such that the first member is adapted to restrict external objects from entering the opening of the housing. Further, at least one connecting member is deformable such as a bellow type between the first member and the second member such that the connecting member extends or is collapsed along with the tongue of the latch plate. Each of the connecting members includes a first leg and a second leg unfolded when the gate extends to the opening and folded when the gate is collapsed toward the ejector.

In accordance with a further aspect of the present disclosure, the gate and the ejector are formed with one single piece. Further, the gate is formed of a plastic material, which allows to deform and return to an original shape of the gate.

In accordance with a further aspect of the present disclosure, the seatbelt buckle further includes a sealing member sized to fit around a gap defined between the housing and the button such that the sealing member restricts external objects from entering the gap of the housing. The sealing member is integrated with the housing of the buckle, and extends toward the button from the housing in a flap fashion sitting over the button. The sealing member is formed of an injection molding material and made by an injection molding process.

In accordance with a further aspect of the present disclosure, a gate includes at least one connecting member, which is deformable to extend to the opening and be collapsed toward the ejector such that the gate linearly moves between an extended state of the connecting member and a collapsed state of the connecting member. The first member includes an outer perimeter engaging with an inside edge surface around the opening of the housing in the extended state of the connecting member to restrict external objects from entering the opening of the housing. When the tongue of the latch plate is inserted into the opening of the housing, the connecting member of the gate is collapsed toward the ejector defined as the collapsed state of the connecting member. After the connecting member is fully collapsed, the tongue of the latch plate is securely latched in the seatbelt buckle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
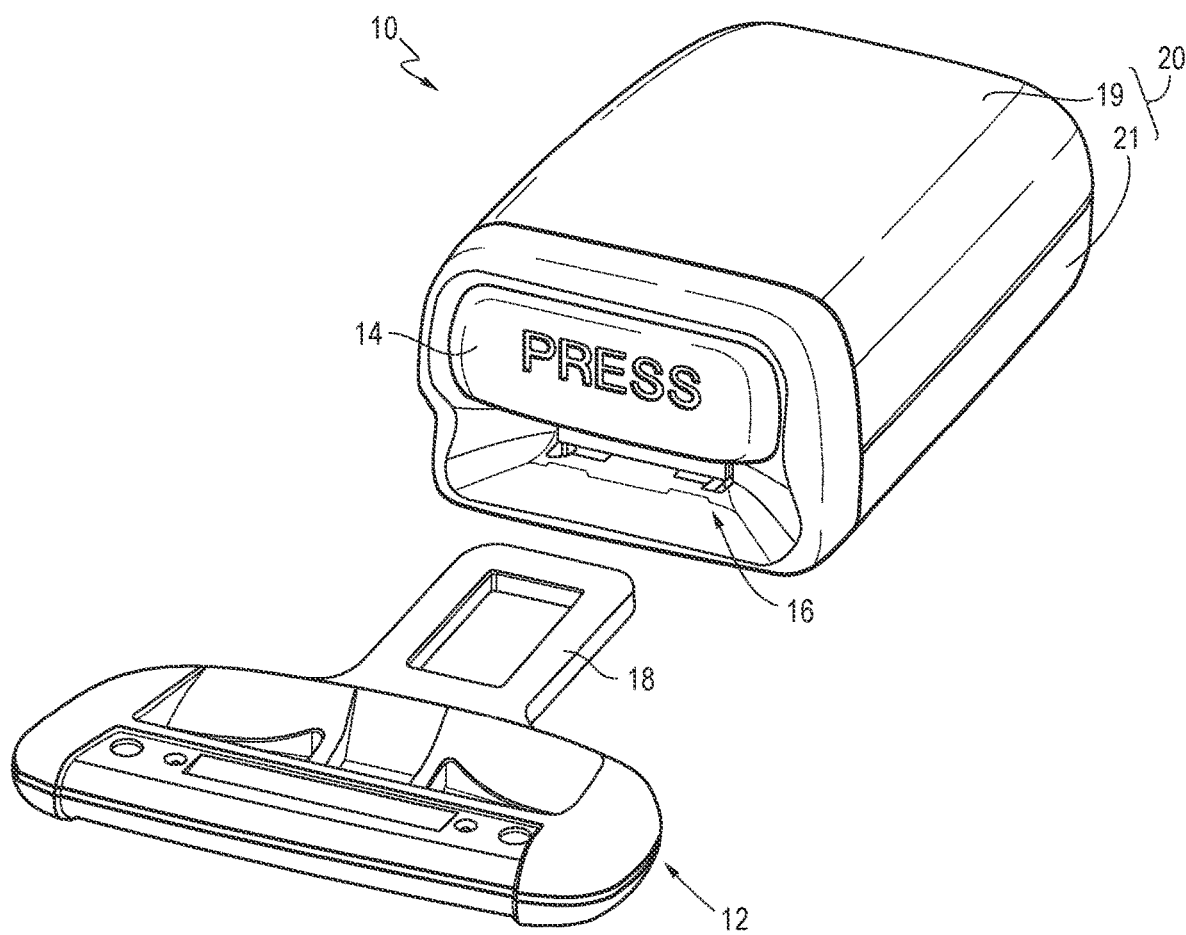
FIG. 1 is a perspective view of a seatbelt buckle device operatively associated with a latch plate in accordance with an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to the drawings, FIG. 1 shows a seatbelt buckle 10 and a latch plate 12 as parts of an occupant restraint system in a vehicle. The seatbelt buckle 10 and the latch plate 12 with a seatbelt webbing (not shown) are provided in vehicles to restrain occupants in the event of a vehicle crash. The seatbelt buckle 10 generally has a movable release button 14 that translates with the seatbelt buckle 10 between an unlatched position and a latched position, and an opening 16 configured to receive a locking device such as a latch plate 12 having a tongue 18. The latch plate 12 is carried by the seatbelt webbing of the vehicle in a conventional manner. The seatbelt buckle 10 is conventionally mounting to a vehicle seat or a structure of the vehicle.

The latch plate 12 with the tongue 18 illustrated in FIG. 1 will be understood to be conventional insofar as the present disclosure are concerned. As shown in FIG. 1, the latch plate 12 includes a single tongue 18. It will be understood, however, that the present disclosure may be used with other latch plates, including but not limited to convention latch plates having tongue portions of various configurations.

In accordance with the exemplary embodiment of FIG. 1, the seatbelt buckle 10 has a generally rectangular box shape defined by a cover or housing 20 having an upper cover portion 19 and a lower cover portion 21. The upper cover portion 19 and the lower cover portion 21 is securely coupled to one another to provide an enclosed structure. It will be appreciated that other known manners for providing an enclosed space for the seatbelt buckle 10 are contemplated in this disclosure.

Figure 2:
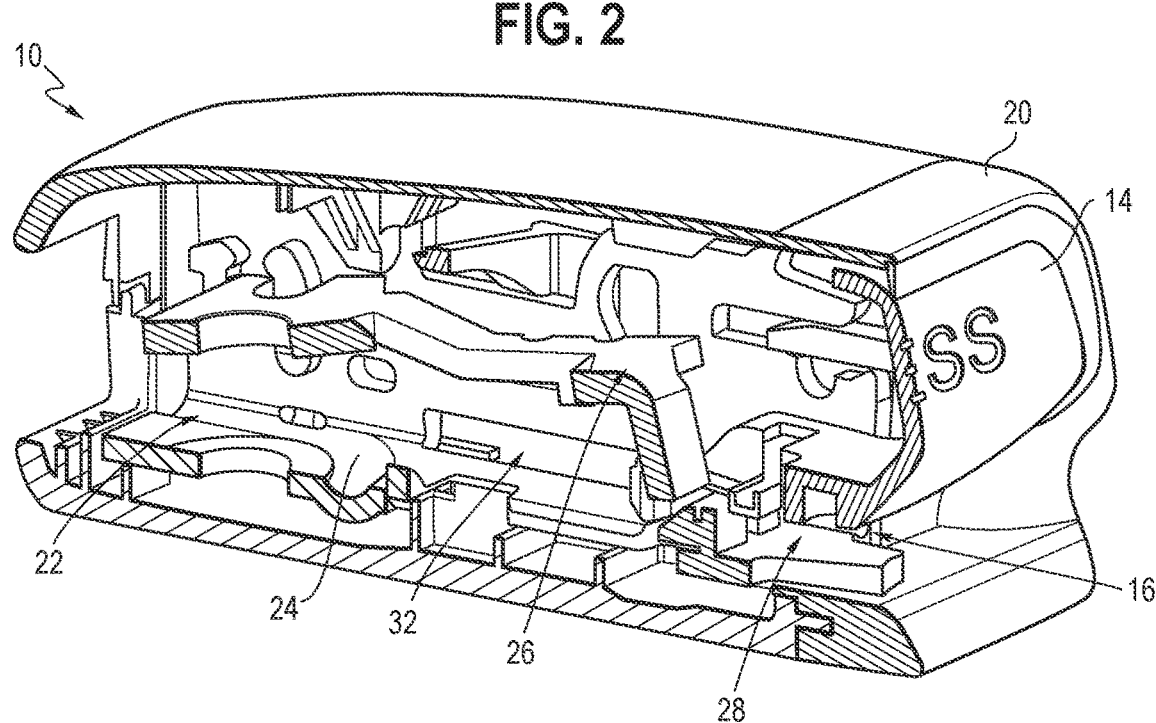
FIG. 2 is a cut-away view of the seatbelt buckle device of FIG. 1.

Referring to FIG. 2, the housing 20 of the seatbelt buckle defines an interior cavity 22 sized to accommodate a frame 24 and a locking mechanism 26 associated with the frame 24 for retaining the latch plate 12 within the housing 20. As shown in FIG. 2, some components of the locking mechanism 26 are fixed to the housing 20, whereas other components are moveable relative to the housing 20. Further, the release button 14 translates within the seatbelt buckle 10 relative to the housing 20. The release button 14 mechanically engages the locking mechanism 26 of the seatbelt buckle 10 to selectively retain the latch plate 12 (see FIG. 1) relative to the seatbelt buckle 10.

The seatbelt buckle 10 is operative in a latched state (or a latched position) and an unlatched state (or an unlatched position) of the latch plate 12. In the unlatched state, the latch plate 12 is inserted into the seatbelt buckle 10 or freely removed from the seatbelt buckle 10, and in the latched state, the tongue 18 of the latch plate 12 is inserted into the opening 16 and placed in a passage 28 inside the opening 16 of the housing 20 such that the locking mechanism 26 inside the housing 20 prevents the latch plate 12 from being removed from the seatbelt buckle 10. The release button 14 and the locking mechanism 26 are biased toward the latched position such that when the release button 14 is not pressed, the locking mechanism 26 of the seatbelt buckle 10 prevents the inserted latch plate 12 from being removed from the seatbelt buckle 10. Pressing the release button 14 against its bias and toward an unlatched position will in turn force the locking mechanism 26 against its bias and into the unlatched position, thereby allowing the latch plate 12 to be freely removed from the seatbelt buckle 10.

The locking mechanism 26 is also arranged to allow the latch plate 12 to be inserted into the passage 28 of the housing 20 without requiring that the release button 14 be manually depressed, as is typical in traditional seatbelt buckles. The tongue 18 of the latch plate 14 will cause the locking mechanism 26 to move upon contacting them, forcing them against its biases. Once the latch plate 12 has been inserted a predetermined distance of the passage 28, the biases of the locking mechanism 26 will cause the locking mechanism 26 to return the seatbelt buckle 10 to the latched position, thereby retaining the latch plate 12 in the latched position.

Figure 3:
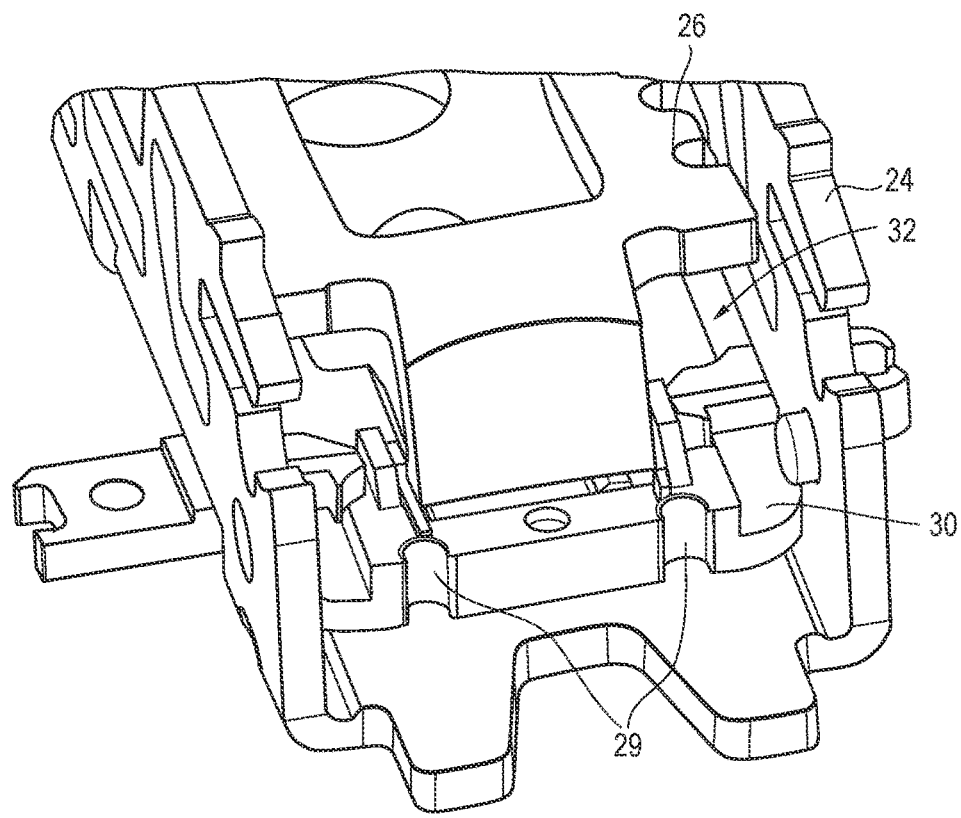
FIG. 3 is a perspective view of a frame and a locking mechanism of the seatbelt buckle device of FIG. 1.

Referring to FIG. 3, the seatbelt buckle 10 further includes an ejector 30 mechanically coupled to the frame 24 and slidably moved in an ejector slot 32 formed in the frame 24. As shown in FIG. 3, the ejector 30 is operatively engaged with the locking mechanism 26 and configured to slide along the elector slot 32 of the frame 24. When the tongue 18 of the latch plate 12 is inserted into the housing 20, the ejector 30 is pushed there against and slides within the housing 20. Further, when latching of the tongue 18 inside the housing 20 is released, the ejector 30 is biased and slides from the rear side inside the housing 20 toward the opening 16 of the housing 20. As the ejector 30 slides in this manner, the tongue 18 is pushed out of the housing 20.

Figure 4:
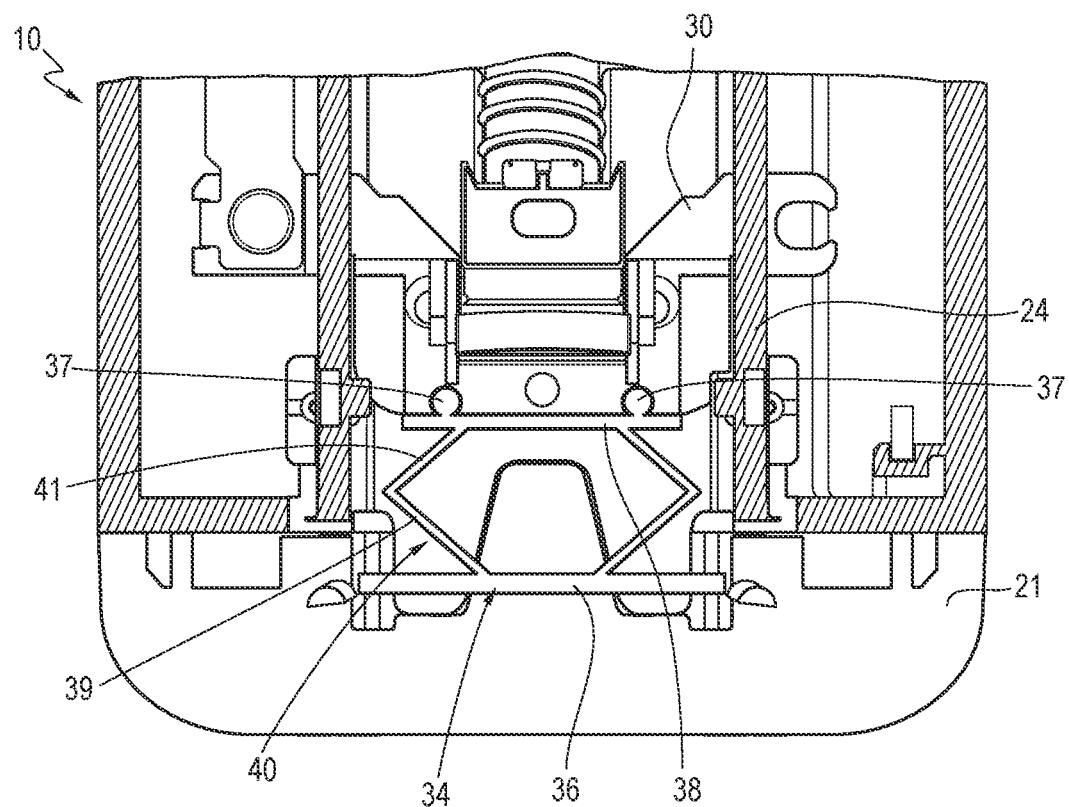
FIG. 4 is a plan view of the seatbelt buckle device without an upper cover portion of a housing.

Referring to FIGS. 1 and 4, the seatbelt buckle 10 further includes a gate 34 sized to fit in the passage 28 of the housing 20 such that the gate 34 is arranged and linearly moved in the passage 28 between the ejector 30 and the opening 16 of the housing 20. The gate 34 is configured to restrict external objects from entering the opening 16 of the housing 20. As shown in FIG. 4, the gate 34 is formed with a single unit having a first member 36, a second member 38, and at least one connecting member 40 such that the gate 34 can be formed as a separate component from the ejector 30. In another approach, the gate 34 can be formed with the ejector 30 as a single piece. Further, in accordance with an exemplary embodiment of FIG. 4, each connecting member 40 is formed with a first leg 39 and a second leg 41 and attached to each of the first member 36 and the second member 38. The gate 34 is generally formed of a plastic material that allows to deform and return to its original shape, and also is durable enough for its lifetime.

In FIGS. 3 and 4, the ejector 30 has a pair of recesses 29 to receive a pair of ears 37 formed in the second member 38 such that the gate 34 is attached and also mounted to the ejector 30, and the gate 34 is linearly moved inside the passage 28 of the housing 20. When the ejector 30 and the gate 34 are assembled, the pair of ears 37 of the second member 38 fit into the pair of recesses 29 formed in the ejector 30 such that, when the tongue 18 is inserted into the housing 20, the ejector 30 and the gate 34 are moved together after the connecting members 40 of the gate 34 are fully collapsed. In another approach, the ejector 30 and the gate 34 are attached to each other with an adhesive material in a bonded manner.

Figure 4A:
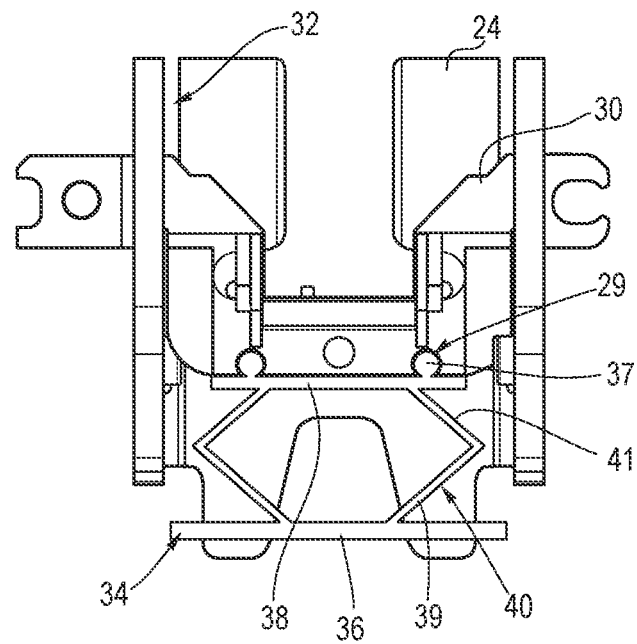
FIG. 4A shows the frame, an ejector, and a gate interconnected in the seatbelt buckle device of FIG. 1.
Figure 6:
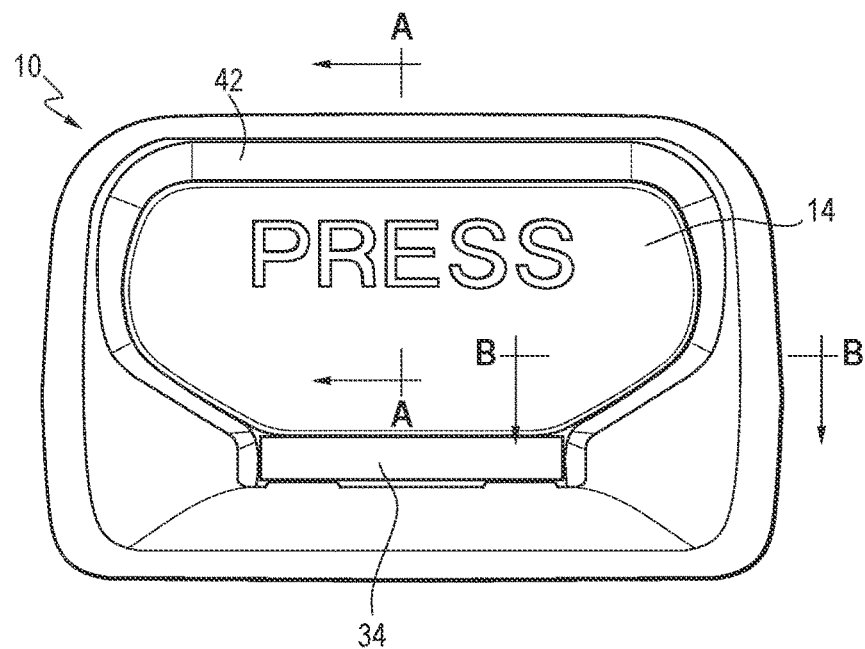
FIG. 6 is a plan view of the seatbelt buckle device of FIG. 1, FIG. 6A a section cut-away view of the seatbelt buckle device, taken along line A-A of FIG. 6.

In FIGS. 4 and 4A, further, the second member 38 is attached to the ejector 30 and the first member 36 is sized to fit in the opening 16 (see also FIG. 6). Each end of the connecting member 40 is attached to the first and second members 36 and 38 respectively such that the first and second member 36 and 38, and the connecting member 40 are formed as a single unit. However, in accordance with other exemplary embodiments of the present disclosure, the first and second member 36 and 38, and the connecting member 40 as separate parts are securely connected to form the gate 34. As shown in FIGS. 4 and 4A, the pair of connecting members 40 arranged between the first and second members 36 and 38 are formed as a bellows type such that the first leg 39 and the second leg 41 are fully folded when the tongue 18 is fully inserted and are unfolded with an angle when the tongue 18 of the latch plate 12 is released from the housing 20 of the seatbelt buckle 10. Accordingly, the connecting member 40 can be extended or collapsed (or compressed) in a linear fashion inside the passage 28 of the housing 20. In another approach, the connecting member 40 can be formed with different ways such as a mechanical linkage system to be extended or collapsed.

Figure 5A:
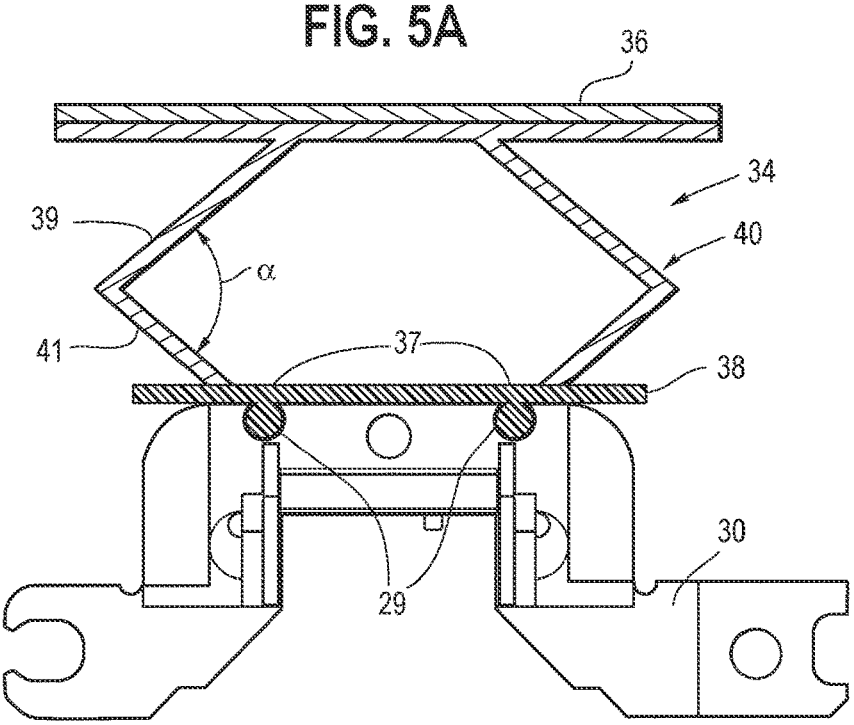
FIG. 5A shows the gate attached to the ejector in a fully extended position of the gate.
Figure 5B:
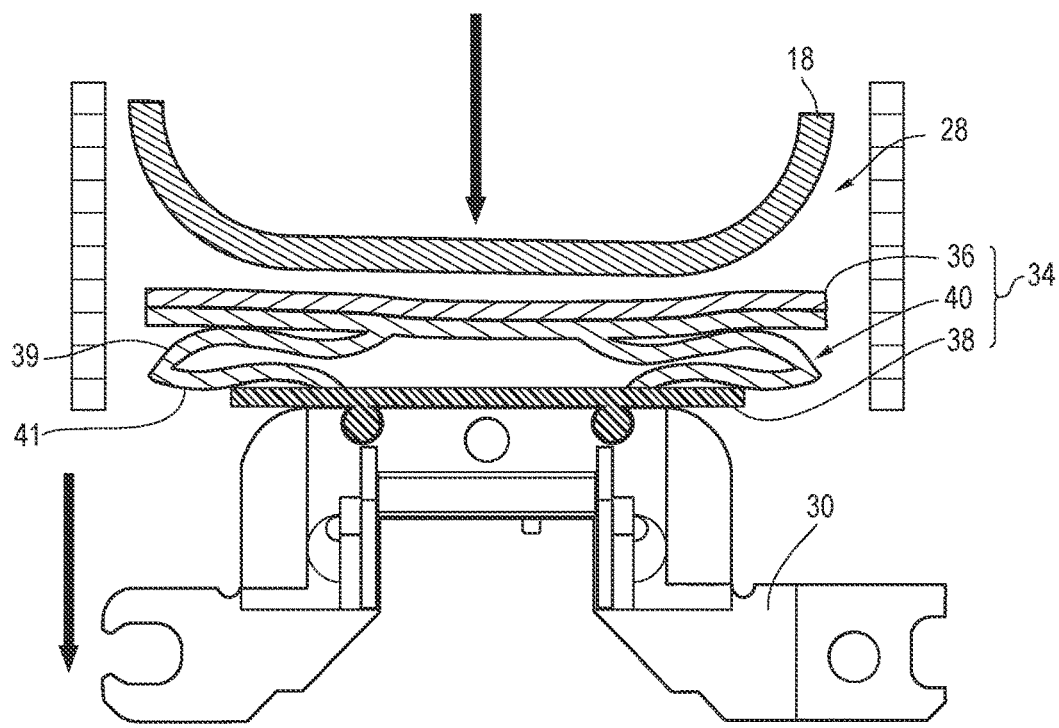
FIG. 5B shows the gate attached to the ejector in a fully compressed position when a tongue is inserted into the housing.

As shown in an example of FIG. 5A, the first leg 39 and the second leg 41 are unfolded and kept an angle α between the first and second legs 43 and 45 defined as an extended state of the connecting member 40. In the extended state of the connecting member 40, due to an engagement between the first member 36 of the gate 34 and an inside edge surface around the opening 16, the connecting member 40 keeps an angle α between 30° and 180° according to the shape or size of the gate 34 arranged inside the passage 28 of the housing 20. Further, in the extended state of the connecting member 40, the gate 34 is configured to restrict the external objects from entering the opening 16 of the housing 20. As shown in FIG. 5B, the first leg 39 and the second leg 41 are fully folded due to the inserted tongue 18 inside the passage 28 defined as a collapsed state of the connecting member 40. In the collapsed state of the connecting member 40, the first leg 39 and the second leg 41 are folded to be substantially parallel and the angle α between the first and second legs 39 and 41 is substantially 0°. Accordingly, the connecting member 40 of the gate 34 is fully folded before moving the gate 34 with the ejector 30. As described above, the connecting member 40 is formed with a plastic material that allows to deform and return to its original shape such that the connecting member 40 moves back to an original position such that the connecting member 40 moves to the extended state from the collapsed state when the latch plate 12 is released from the housing 20.

As described above, FIG. 5A shows the gate 34 attached to the ejector 30 in the extended state of the connecting member 40 and FIG. 5B shows the gate 34 attached to the ejector 30 in the collapsed state of the connecting member 40. As shown in FIG. 5A, the connecting member 40 extends such that the first member 36 is sized to fit in the opening 16 of the housing 20 (see also FIG. 6). For example, in the extended state of the connecting member 40, the first member 36 of the gate 34 engages with an inside edge surface around the opening 16. In another approach, the first member 36 of the gate 34 has a stepped outer perimeter (not shown) to fit the inside edge surface around the opening 16. Accordingly, before inserting the tongue 18 of the latch plate 12 into the seatbelt buckle 10, the gate 34 extends to fit in the opening 16 and restricts the external objects from entering the opening 16 of the housing 20, which is defined as the extended state of the connecting member 40. In the extended state of the connecting member 40, the gate 34 is configured to provide a physical barrier from the exterior of the seatbelt buckle 10 to the passage 28 of the housing 20. As shown in FIG. 5B, further, the connecting member 40 is fully folded when the tongue 18 of the latch plate 12 is inserted into the opening 16, and just before the locking mechanism 26 with the ejector 30 is biased, which is defined as the collapsed state of the connecting member 40. Like this, when latching, the front edge of the tongue 18 pushes the gate 34 deformed while the ejector 30 is static until the force exerted by the tongue 18 is applied to transfer the tongue displacement to the ejector 30 and activate the locking mechanism 26.

Figure 6A:
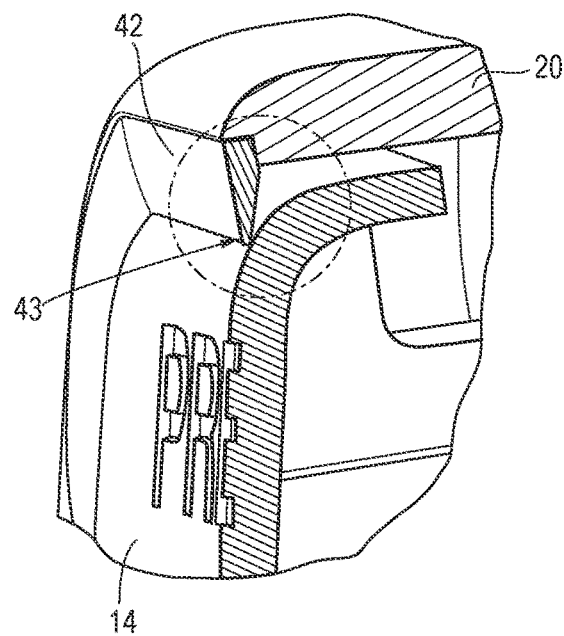
FIG. 6B is a section cut-away view of the seatbelt buckle device, taken along line B-B of FIG. 6.

Referring to FIG. 6, the seatbelt buckle 10 further includes a sealing member 42 arranged around the release button 14. The sealing member 42 is configured to provide a physical barrier to restrict external objects from entering into a gap 44 defined between the housing 20 and the release button 14. Further the sealing member 42 restricts liquid spillage from entering into the gap and forming a sticky boundary between the housing 20 and the release button 14. As shown in FIG. 6A, the sealing member 42 is formed of a plastic material, which is moldable (e.g., 2K molded part) such that the sealing member 42 is flexible and bendable to be in contact with the release button 14 at all the time. Further, the sealing member 42 is made by an injection molding process.

Figure 6B:
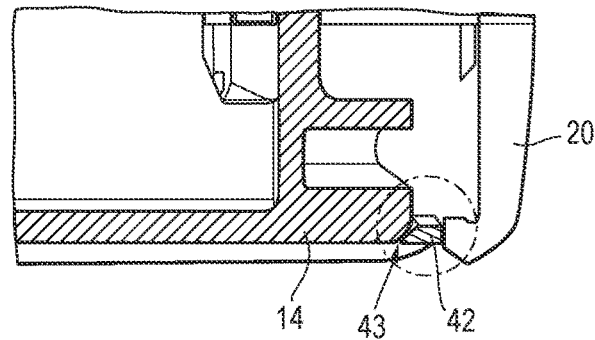

FIGS. 6A and 6B show cross-section end views in two locations of FIG. 6. As shown in FIGS. 6A and 6B, the sealing member 42 is sized to fit around the gap 44 between the housing 20 and the release button 14. Further, the sealing member 42 is attached and integrated with the housing 20 of the seatbelt buckle 10 and extends from the housing 20 to the release button 14 such that an end 43 of the sealing member 42 is in contact with the release button 14 when the release button 14 is pressed to release the latch plate 12.

Figure 7:
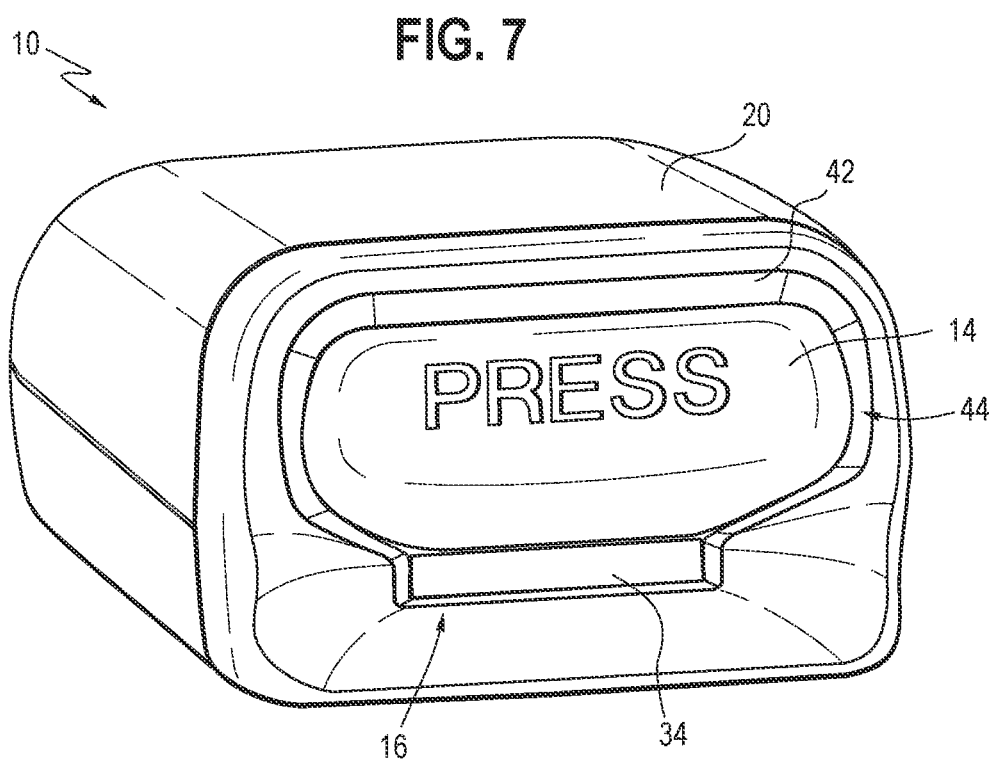
FIG. 7 is another perspective view of the seatbelt buckle device of FIG. 1.

FIG. 7 shows the housing 20 of the seatbelt buckle 10 having the gate 34 and the sealing member 42. As described above, the seatbelt buckle device 10 of the present disclosure includes the gate 34 and the sealing member 42 to provide a physical barrier to restrict the external objects from entering the inside of the housing 20. Both the gate 34 and the sealing member 42 are easily assembled with the seatbelt buckle 10 which is currently in production. Accordingly, the installation of the gate 34 and the sealing member 42 in the seatbelt buckle 10 as described above reduces its manufacturing cost and time for providing the sealing effect to restrict external objects from entering the inside of the housing 20 through the opening 16 and gap 44.

While the above description constitutes the preferred embodiments of the present invention, it will be appreciated that the invention is susceptible to modification, variation and change without departing from the proper scope and fair meaning of the accompanying claims.

What is claimed is:

1. A seatbelt buckle for receiving a tongue of a latch plate in an occupant restraining system of a vehicle, the seatbelt buckle comprising:
    a housing including a frame and a locking mechanism operatively connected with the frame, the housing further including a passage to receive the tongue of the latch plate;
    an ejector operatively coupled to the locking mechanism, the ejector releasably retaining the tongue of the latch plate;
    a button in sliding engagement with the locking mechanism, the button movable to release the locking mechanism;
    an opening formed in the housing for inserting the tongue of the latch plate into the passage of the housing; and
    a gate securely attached to the ejector and sized to fit in the opening of the housing, the gate moving in a linear fashion along with the tongue of the latch plate,
    wherein the gate is formed with a first member, a second member, and at least one connecting member angularly attached to each of the first and second members, and
    wherein the second member of the gate is formed with a pair of ears fitting in a pair of recesses formed in the ejection such that the gate is securely attached to the ejector as a single unit.

2. The seatbelt buckle of claim 1, wherein the gate arranged between the ejector and the opening inside the passage of the housing extends to the opening of the housing when the tongue of the latch plate is not inserted and is collapsed toward the ejector when the tongue of the latch plate is inserted into the opening of the housing.

3. The seatbelt buckle of claim 2, wherein when the gate extends to engage with an inner edge surface around the opening of the housing, the gate fits in the opening and restricts external objects from entering the opening of the housing.

4. The seatbelt buckle of claim 1, wherein when the gate is collapsed toward the ejector, the tongue of the latch plate is latched inside the housing of the seatbelt buckle.

5. The seatbelt buckle of claim 1, wherein an outer perimeter of the first member engages with an inside edge surface around the opening of the housing such that the first member is adapted to restrict external objects from entering the opening of the housing.

6. The seatbelt buckle of claim 1, wherein the at least one connecting member is deformable such as a bellow type between the first member and the second member such that the connecting member extends or is collapsed along with the tongue of the latch plate.

7. The seatbelt buckle of claim 1, wherein each of the connecting members includes a first leg and a second leg unfolded when the gate extends to the opening and folded when the gate is collapsed toward the ejector.

8. The seatbelt buckle of claim 1, wherein the gate is formed of a plastic material, which allows to deform and return to an original shape of the gate.

9. The seatbelt buckle of claim 1, wherein the seatbelt buckle further comprises a sealing member sized to fit around a gap defined between the housing and the button such that the sealing member restricts external objects from entering the gap of the housing.

10. The seatbelt buckle of claim 9, wherein the sealing member is integrated with the housing of the buckle, and extends toward the button from the housing in a flap fashion sitting over the button.

11. The seatbelt buckle of claim 9, wherein the sealing member is formed of an injection molding material and made by an injection molding process.

12. A seatbelt buckle for receiving a tongue of a latch plate in an occupant restraining system of a vehicle, the seatbelt buckle comprising:
    a housing including a frame and a locking mechanism operatively connected with the frame, the housing further including a passage to receive the tongue of the latch plate;
    an ejector operatively coupled to the locking mechanism, the ejector releasably retaining the tongue of the latch plate;
    a button in sliding engagement with the locking mechanism, the button movable to release the locking mechanism;
    an opening formed in the housing for inserting the tongue of the latch plate into the passage of the housing; and
    a gate including a first member, a second member, and at least one connecting member angularly attached to the first and second members, the at least one connecting member foldable to extend to the opening and be collapsed toward the ejector such that the gate linearly moves between an extended state of the connecting member and a collapsed state of the connecting member.

13. The seatbelt buckle of claim 12, wherein the second member is formed with a pair of ears and the ejector is formed with a pair of recesses such that the ears of the second member fit in the recesses of the ejector to be securely attached to each other.

14. The seatbelt buckle of claim 12, wherein the first member includes an outer perimeter engaging with an inside edge surface around the opening of the housing in the extended state of the connecting member to restrict external objects from entering the opening of the housing.

15. The seatbelt buckle of claim 12, wherein when the tongue of the latch plate is inserted into the opening of the housing, the connecting member of the gate is collapsed toward the ejector defined as the collapsed state of the connecting member.

16. The seatbelt buckle of claim 15, wherein after the connecting member is fully collapsed, the tongue of the latch plate is securely latched in the seatbelt buckle.

17. A seatbelt buckle for receiving a tongue of a latch plate in an occupant restraining system of a vehicle, the seatbelt buckle comprising:
- a housing including a frame and a locking mechanism operatively connected with the frame, the housing further including a passage to receive the tongue of the latch plate;
- an ejector operatively coupled to the locking mechanism, the ejector releasably retaining the tongue of the latch plate;
- a button in sliding engagement with the locking mechanism, the button movable to release the locking mechanism;
- an opening formed in the housing for inserting the tongue of the latch plate into the passage of the housing;
- a gate securely attached to the ejector and sized to fit in the opening of the housing, the gate moving in a linear fashion along with the tongue of the latch plate; and
- a sealing member sized to fit around a gap defined between the housing and the button such that the sealing member restricts external objects from entering the gap of the housing.

* * * * *